Dec. 8, 1953 MacMILLAN CLEMENTS 2,662,043
THERMALLY INSULATED BUILDING
STRUCTURES, INCLUDING PANELS
Filed May 8, 1951 2 Sheets-Sheet 1

INVENTOR
MacMillan Clements,
BY
ATTORNEYS

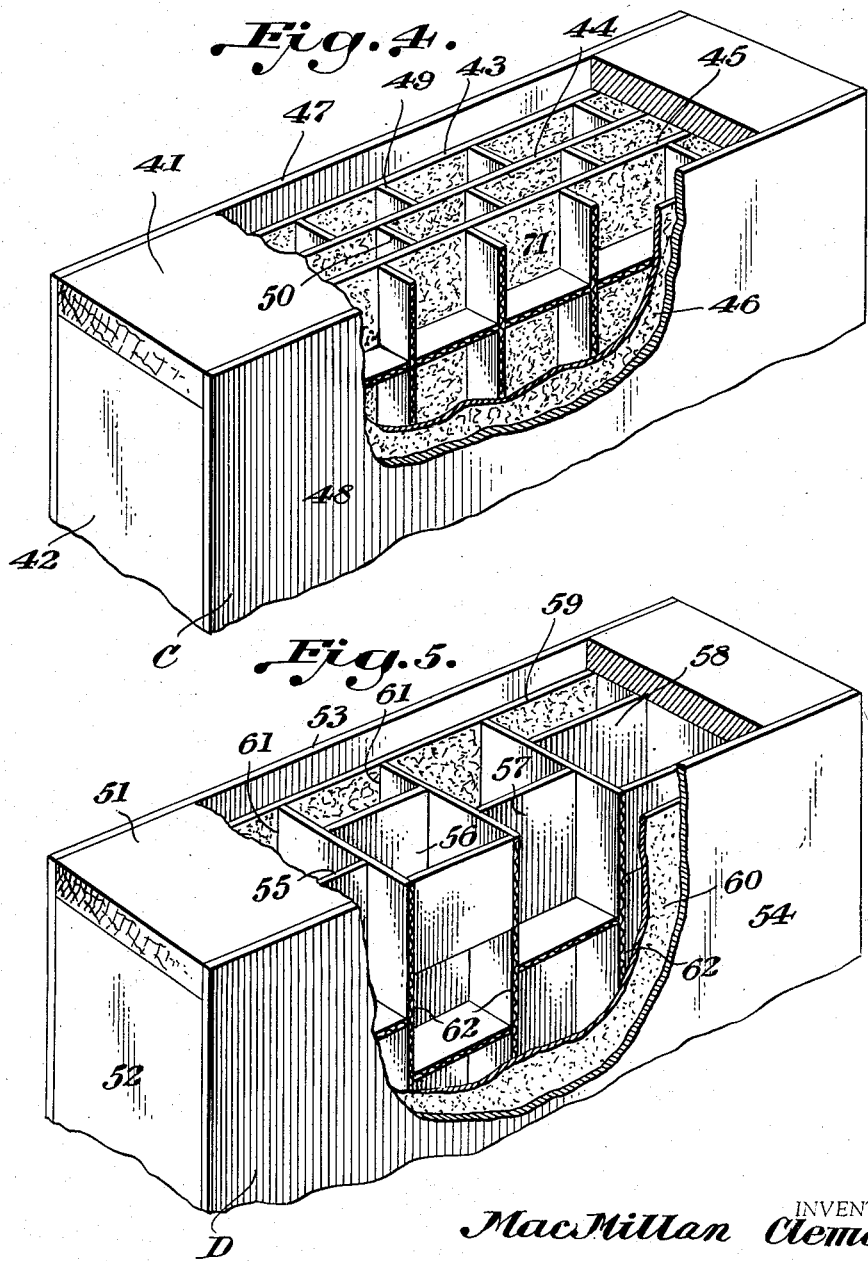

Patented Dec. 8, 1953

2,662,043

UNITED STATES PATENT OFFICE 2,662,043

THERMALLY INSULATED BUILDING STRUCTURES, INCLUDING PANELS

MacMillan Clements, Bethel, Conn.

Application May 8, 1951, Serial No. 225,195

2 Claims. (Cl. 154—45)

This invention relates to thermally insulated building structure including structural panels, and more particularly for improvements which are suitable for use in building structures including walls, ceilings, doors, and refrigerators, particularly walk-in type refrigerators, and for all purposes where a very light panel is needed having a high degree of thermal insulation.

An object of the invention, therefore, is to provide a structural panel which may be of any desired thickness and which consists of a plurality of elements that may be duplicated in order to increase the amount of thermal insulation according to requirements.

It is an additional object of the invention to provide a panel building structure which utilizes inexpensive materials and which may include one or more light-reflective foil surfaces forming a barrier against radiant heat.

A further object of the invention is to provide a structure as set forth in the next preceding paragraph wherein a plurality of light-reflective foil surfaces are provided with means for independently suspending each of the foil surfaces, or layers, in substantially parallel relation to one another and perpendicular to the direction of heat flow.

Yet another object of the invention is to provide a structure or a panel of the type described wherein novel means is provided for separating the foil or other heat reflecting layers wherein a plurality of pockets are provided in the separating means.

An additional object of the invention is to provide an exceedingly inexpensive, light-weight system for non-conductive separators forming part of a panel to thereby establish and maintain a non-contiguous and relatively parallel arrangement of heat-reflecting layers such as metal foil layers, which panels may form parts of both vertical and horizontal enclosures such as partitions, walls, ceilings, etc., of a building or a refrigerating unit.

Other objects will appear hereinafter throughout the specification.

In the drawings:

Figure 4 is a perspective view partly broken away of an alternate construction, and Figure 5 is a perspective view partly broken away of a third form of the invention.

Figure 1:
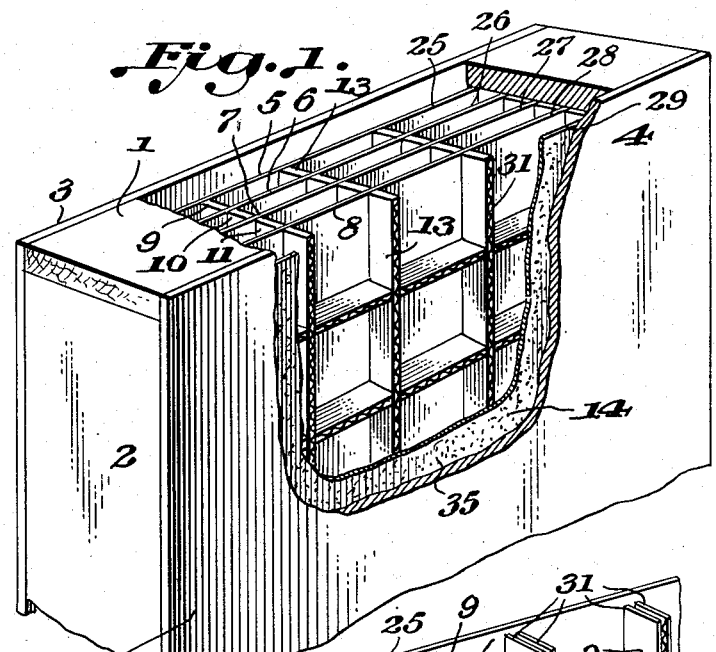
Figure 1 is a perspective view partly broken away showing the interior of the panel.

Heretofore panels or walls, ceilings, etc., which have been constructed of insulated materials, depend upon a plurality of dead air cells which are separated from each other by walls that are tenuously connected. There is thus formed a plurality of air pockets in a matrix of organic or inorganic material of low thermal conductive value. These so-called dead air spaces are generally recognized as forming the most important feature of these forms of insulation. The prior art has recognized that air is, generally speaking, the best form of insulation against thermal conductance. An absolute vacuum is a perfect nonconductor of heat or cold, but it is also the most perfect medium of radiant heat. Were the extent of vacuum between the earth and sun to be diluted to over $\frac{1}{100}$ of 1% of air, as we know it at sea level, the equatorial oceans would be turned to polar ice.

In recognition of these facts the present invention provides a combination of a plurality of dead air cells and at least two or more barriers to radiant heat loss in an inexpensive system whereby dead air cells are provided between reflective metal surfaces, preferably foil membranes, so that both conducted and radiant heat losses may be controlled and almost completely prevented. In view of the fact that cellular non-radiant reflective forms of insulation utilize motionless air as the insulating medium and achieve air stability by means of mechanically interrupting the convective air currents which occur in open cavities, the present invention discloses a system of separating radiant reflective foil membranes by a plurality of relatively dead air pockets which are provided by the construction hereinafter described.

In the present invention, therefore, there has been disclosed a structure which embodies the unique characteristics of both low thermal conductivity and low radiant emissivity.

In addition, the present structure includes the following characteristics which are desirable in all forms of insulation:

1. Extremely low specific heat or heat inertia, equally important in arctic or tropical temperatures where heat absorption or retaining characteristics are undesirable.

2. A plurality of vapor barriers.

3. A relatively non-hygroscopic system where the infusion of moisture will not impair its effectiveness as an insulating medium.

4. While not introduced as a limiting feature in the scope of this invention, it can be shown that the system is compactible to within 10% of its functioning value for purposes of shipment and storage.

Broadly speaking, the present system comprises a plurality of relatively compressible grids of egg crate construction interleaved with sheets of comparatively thin reflective material such as metal foil. The grids may be of any suitable material so long as they are of a material which may be readily compressible in the construction of the system, and which will when assembled confine and separate the reflective sheets. Such grids may be composed of corrugated box board, for example, but it is to be expressly understood that the invention is not limited to this construction, although it is the preferred construction used.

The air pockets formed by the several layers of grids may not be in coincidence with each other, but may be offset. In any event the grids must be somewhat compressible to conform to the cavities and to provide an interlocking or frictional support for the interleaved reflective sheets or foil membranes. It is to be understood, however, that the compression of the grid separators give to the structure a definite tensioning effect on the interleaved foil membranes and causes them to effectively seal off each dead air space.

Referring to the drawings, the letter A indicates the panel as a whole. Preferably such panels are factory constructed and are shipped to the erection site where the building is being constructed. When manufacturing refrigerating units or other comparatively small heat or cold insulating articles, one or more of the panels A will be used to form the walls of such articles. In each case the panels may be fabricated and made into the completed articles at the same factory, or the panels can be constructed in one factory and shipped to another where the assembly of the articles takes place.

The top and bottom members, ends and the two sides are indicated by numerals 1, 2, 3 and 4, respectively. While the bottom and one of the ends and one of the sides are not shown, it will be understood that the usual construction includes pairs of such members that are identical, unless conditions require that the shape or thickness of these members vary.

Figure 2:
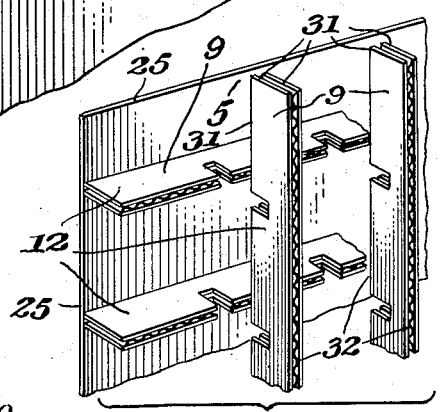
Figure 2 is an enlarged detail view showing the separators before being joined together and one of the sheets.

A plurality of spaced heat reflecting metal sheets, preferably metal foil, are shown at 5, 6, 7, 8 and 14. The grids are indicated at 9, 10, 11 and 13, each grid being sandwiched between a pair of foil sheets, individual grid pieces being indicated at 12 in Figure 2. The foil sheets 5 and 14 are adhesively secured by glue or a suitable adhesive, preferably a waterproof adhesive to the sides 3 and 4, respectively. The side edges of the grids are also adhesively secured to the foil sheets by said adhesive, so as to make a unit of the sheets and grids. It will also be understood that all four of the side edges 25, 26, 27, 28 and 29 are sealingly adhered to the top and bottom and side members 1 and 2, so that no air passes around the said side edges. These side edges may be of extra length so as to form a short flange, such flanges being shown at 30 in Figure 3 and being covered with adhesive for more securely attaching the sheets to the top, bottom and side members, thereby preventing eddy currents of air from moving around the edges of the sheets. Moreover, all edges of the grids, as shown at 31, are adhesively secured by any suitable adhesive 32 to the sheets 5 to 8 and 14, and to the top, bottom and side members.

Figure 3:
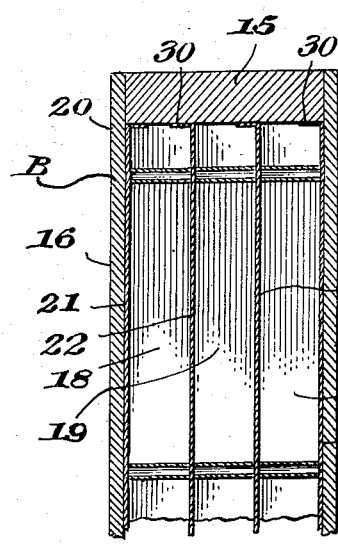
Figure 3 is a transverse vertical section partly broken away of another form of panel.

In Figure 3, the construction is the same as that shown in Figure 1, but in Figure 3 the panel B is provided with only three separator sheets of foil or heat reflecting sheets 21, 22, 23 and 24, the grids being shown at 18, 19 and 20.

It will further be understood that the strengthening sides 16 and 17 are similar to those shown in Figure 1, and that the top 15 is similar to top 1 of that figure. The bottom is similar to the top and the sides 19, only one of which is shown, is also similar to that shown in Figure 1. These parts may be constructed of any suitable lightweight preferably fibrous material, such as of wood, fiberboard, hardboard, wood veneer, etc.

Sheets 5 and 14 of the construction shown in Figure 1, and sheets 21 and 24 of the construction shown in Figure 3 are adhesively secured to sides 3, 4, 16 and 17 respectively by a water-proof adhesive or cement.

The construction shown in Figure 4 is similar to the construction shown in Figure 1 except that the grids are offset from each other and are not in direct alignment as shown in Fig. 1.

The letter C indicates the panel as a whole and this panel is provided with top and bottom members and sides indicated by the numerals 41 and 42 respectively. It will be understood that the bottom and opposite side, both not being shown, are similar to those indicated at 41 and 42.

The plurality of spaced heat reflecting metal sheets, preferably metal foil, are shown at 43, 44, 45 and 46. Sheets 43 and 46 are preferably attached to sides 47 and 48 by an adhesive, which is preferably water-proof glue. The grids are indicated at 49, 50 and 71. These grids and heat reflecting metal sheets are similar in all respects to those shown in Figures 1 to 3 inclusive.

The structure shown in Figure 5 is similar to that shown in the other figures. However, in this figure, the structure is such that the air pockets are offset from each other both longitudinally and laterally.

The letter D indicates the panel as a whole. This panel is provided with top and bottom members, ends and sides indicated by the numerals 51, 52, 53 and 54. In the structure shown in Figure 5, the grids, instead of extending longitudinally of the panel, extend transverse to the sides 53 and 54 and are arranged in offset relation with each other. As shown, the grids are indicated by the numerals 55, 56, 57 and 58. Extending parallel to the sides 53 and 54 are heat reflecting metal sheets, preferably metal foil, 59 and 60. These sheets are attached by a suitable adhesive such as water-proof glue to the sides 53 and 54, and to the edges 61 and 62 of the grids.

It will be understood that one or more of the sides, bottoms and tops of the panels shown in the several figures may be eliminated and that several of said panels either with or without sides are separated from each other by heat reflecting metal sheets such as metal foil.

A comparison of the panels shown in the several figures herein with other types of insulating panels or insulation generally, such as fiber glass insulation, has shown that the panels of this invention are at least 50% more efficient than where fiber glass is used. Fiber glass is at this time in common use as one of the best types of insulation, not only for the walls of refrigerators, including domestic, deep freeze or walk-in types of refrigerators, but also for the walls of building structures, such as houses, warehouses, etc.

It will be understood that the several forms of the invention shown are furnished for illustration purposes only and that the invention may take other forms. Hence, I desire to be limited in the practice of this invention only to the extent set forth in the appended claims.

I claim:

1. In a panel for buildings and refrigerators, said panel having low radiant heat emissivity, the combination of a plurality of grids each composed of a plurality of parallel strips of material in crossed relationship with a plurality of strips at right angles to the strips first named, each strip being composed of a pair of outside flat paper portions and an inside corrugated paper portion whereby said strips have substantially wide side edges composed of the combined edges of the flat paper portions and the corrugated paper portions, and at least three sheets of metal foil secured under compression and glued to certain of the said side edges of the grids to form with said grids a plurality of sandwiched constructions each comprising an intermediate grid with metal foil sheets on the opposite sides of said grid, said grids being in parallel relationship with each other and providing with said metal foil sheets a plurality of air pockets with the air pockets of one of said grids staggered with respect to the air pockets of the next adjacent grid and the strips of one grid offset with relation to the strips of the next adjacent grid, a frame work surrounding the grids and metal foil sheets, the marginal edges of certain of the strips of said grids extending to the side edges of said framework and being at right angles to the side edges of certain other strips which latter are connected under compression to said metal foil sheets, whereby to fill the space defined by the framework, the air pockets of juxtaposed grids being of different area from each other adjacent the said framework.

2. The structure of claim 1 in which a pair of cover sheets are adhesively attached to the outermost metal foil sheets and to the frame work.

MacMILLAN CLEMENTS.

References Cited in the file of this patent

UNITED STATES PATENTS

| Number | Name | Date |
|---|---|---|
| 2,001,632 | Schlichting | May 14, 1935 |
| 2,037,813 | Munters | Apr. 21, 1936 |
| 2,053,252 | Cook et al. | Sept. 8, 1936 |
| 2,091,918 | Finck | Aug. 31, 1937 |
| 2,095,369 | Quinn | Oct. 12, 1937 |
| 2,332,287 | Zalkind | Oct. 19, 1943 |
| 2,511,620 | Clements | June 13, 1950 |
| 2,512,875 | Reynolds | June 27, 1950 |